US012633122B2

(12) United States Patent
Zeng

(10) Patent No.: US 12,633,122 B2
(45) Date of Patent: May 19, 2026

(54) VIDEO SEGMENTATION METHOD AND APPARATUS, DEVICE, AND MEDIUM

(71) Applicants: Beijing Wodong Tianjun Information Technology Co., Ltd., Beijing (CN); Beijing Jingdong Century Trading Co., Ltd., Beijing (CN)

(72) Inventor: Dezheng Zeng, Beijing (CN)

(73) Assignees: Beijing Wodong Tianjun Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 1092 days.

(21) Appl. No.: 17/763,480

(22) PCT Filed: Apr. 7, 2020

(86) PCT No.: PCT/CN2020/083473
§ 371 (c)(1),
(2) Date: Mar. 24, 2022

(87) PCT Pub. No.: WO2021/062990
PCT Pub. Date: Apr. 8, 2021

(65) Prior Publication Data
US 2022/0375225 A1    Nov. 24, 2022

(30) Foreign Application Priority Data

Sep. 30, 2019    (CN) .......................... 201910943037.0

(51) Int. Cl.
*G06V 20/40*        (2022.01)
*G06V 10/77*        (2022.01)
*G09B 5/06*         (2006.01)

(52) U.S. Cl.
CPC .......... *G06V 20/49* (2022.01); *G06V 10/7715* (2022.01); *G06V 20/46* (2022.01); *G09B 5/065* (2013.01)

(58) Field of Classification Search
None
See application file for complete search history.

(56) References Cited

U.S. PATENT DOCUMENTS 10,474,903 B2 * 11/2019 Tandon .................. G06V 20/41
10,638,135 B1 * 4/2020 Wei ...................... H04N 19/119
(Continued)

FOREIGN PATENT DOCUMENTS

CN        107343223 A    11/2017
CN        107968959 A    4/2018
(Continued)

OTHER PUBLICATIONS

PCT International Search Report dated Jun. 30, 2020, for International Patent Application No. PCT/CN2020/083473.
(Continued)

*Primary Examiner* — Daniel T Tekle
(74) *Attorney, Agent, or Firm* — K&L Gates LLP

(57) ABSTRACT

Provided are a video segmentation method and apparatus, a device, and a medium. The method includes: acquiring a to-be-segmented video, and determining a correspondence between knowledge point data in the to-be-segmented video and video frames in the to-be-segmented video; and segmenting the to-be-segmented video according to the correspondence to obtain at least one video segment.

14 Claims, 4 Drawing Sheets

410

420

Knowledge point recognition module

Video segmentation module

(56) References Cited

U.S. PATENT DOCUMENTS

| 2017/0132498 | A1* | 5/2017 | Cohen | ..................... | G06N 5/022 |
| 2018/0082127 | A1* | 3/2018 | Carlson | .............. | G06F 18/2323 |
| 2019/0228231 | A1* | 7/2019 | Tandon | ................. | G06V 20/41 |
| 2019/0272765 | A1 | 9/2019 | Nguyen et al. | | |
| 2019/0354766 | A1* | 11/2019 | Moore | ................ | G06V 30/153 |
| 2019/0362154 | A1* | 11/2019 | Moore | ................ | G06V 10/764 |
| 2022/0375225 | A1* | 11/2022 | Zeng | ..................... | G06V 20/49 |

FOREIGN PATENT DOCUMENTS

| CN | 108596940 | A | 9/2018 |
| CN | 109151615 | A | 1/2019 |
| CN | 109359215 | A | 2/2019 |
| CN | 109460488 | A | 3/2019 |
| CN | 109934188 | A | 6/2019 |
| CN | 110147846 | A | 8/2019 |

OTHER PUBLICATIONS

Chinese First Search Report dated Feb. 20, 2023 for Chinese Application No. 2019109430370.
Chinese First Office Action dated Feb. 24, 2023 for Chinese Application No. 201910943037.0.

\* cited by examiner

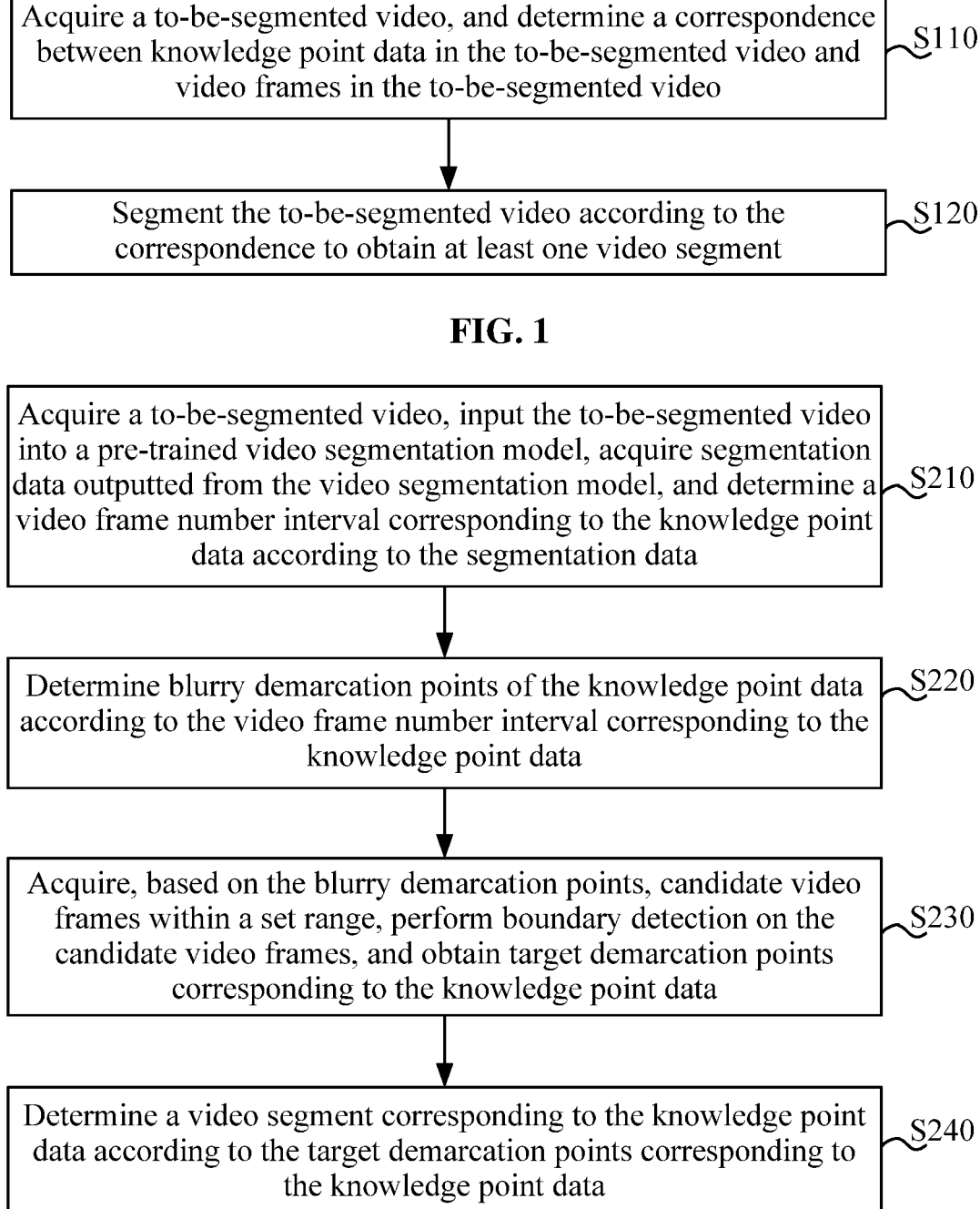

Acquire a to-be-segmented video, and determine a correspondence between knowledge point data in the to-be-segmented video and video frames in the to-be-segmented video    S110

Segment the to-be-segmented video according to the correspondence to obtain at least one video segment    S120

FIG. 1

Acquire a to-be-segmented video, input the to-be-segmented video into a pre-trained video segmentation model, acquire segmentation data outputted from the video segmentation model, and determine a video frame number interval corresponding to the knowledge point data according to the segmentation data    S210

Determine blurry demarcation points of the knowledge point data according to the video frame number interval corresponding to the knowledge point data    S220

Acquire, based on the blurry demarcation points, candidate video frames within a set range, perform boundary detection on the candidate video frames, and obtain target demarcation points corresponding to the knowledge point data    S230

Determine a video segment corresponding to the knowledge point data according to the target demarcation points corresponding to the knowledge point data    S240

FIG. 2

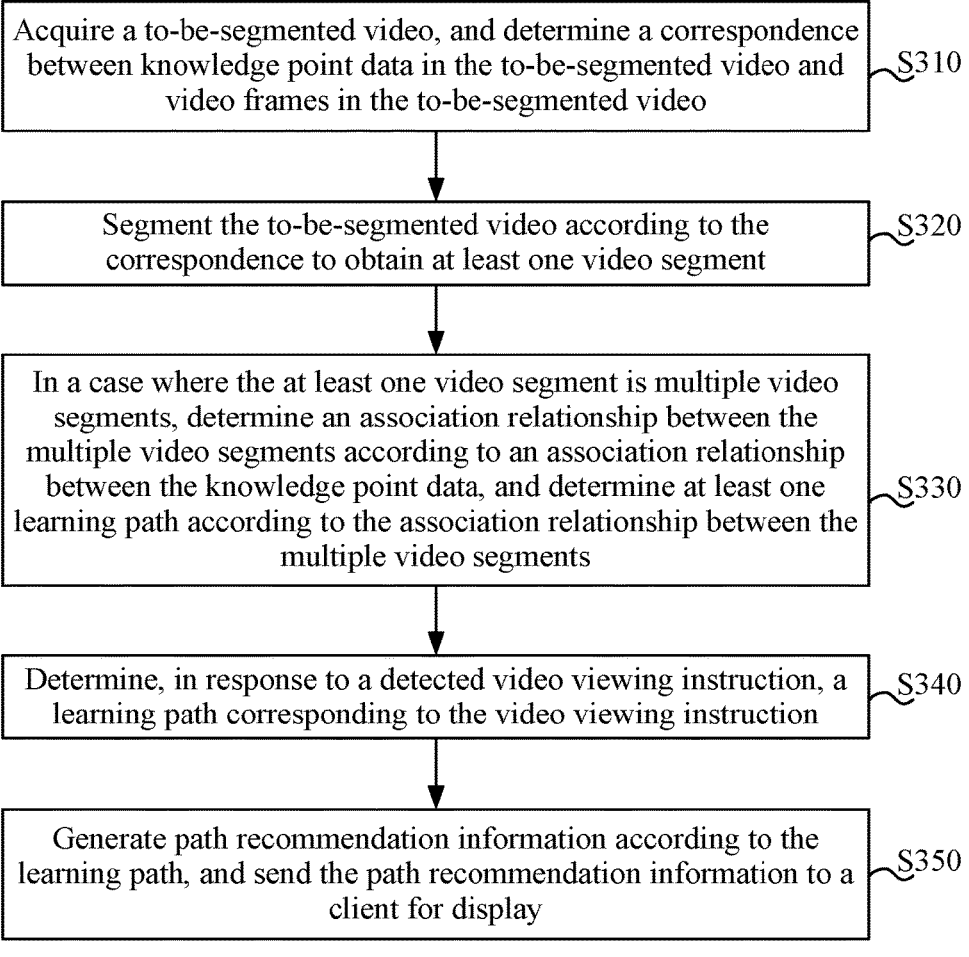

Acquire a to-be-segmented video, and determine a correspondence between knowledge point data in the to-be-segmented video and video frames in the to-be-segmented video ~S310

Segment the to-be-segmented video according to the correspondence to obtain at least one video segment ~S320

In a case where the at least one video segment is multiple video segments, determine an association relationship between the multiple video segments according to an association relationship between the knowledge point data, and determine at least one learning path according to the association relationship between the multiple video segments ~S330

Determine, in response to a detected video viewing instruction, a learning path corresponding to the video viewing instruction ~S340

Generate path recommendation information according to the learning path, and send the path recommendation information to a client for display ~S350

FIG. 3A

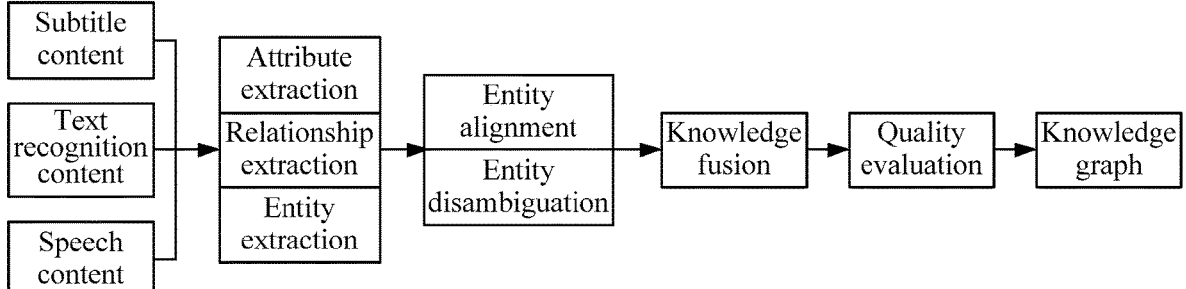

Subtitle content

Text recognition content

Speech content

Attribute extraction

Relationship extraction

Entity extraction

Entity alignment

Entity disambiguation

Knowledge fusion

Quality evaluation

Knowledge graph

FIG. 3B

VIDEO SEGMENTATION METHOD AND APPARATUS, DEVICE, AND MEDIUM

CROSS-REFERENCE TO RELATED APPLICATIONS

This patent application is a 35 U.S.C. § 371 National Stage filing of International Application No. PCT/CN2020/083473, filed on Apr. 7, 2020, which application claims priority to Chinese Patent Application No. 201910943037.0 filed with the China National Intellectual Property Administration (CNIPA) on Sep. 30, 2019, the disclosure of which is are incorporated herein by reference in their entireties.

TECHNICAL FIELD

The present application relates to the field of information processing, for example, a video segmentation method and apparatus, a device, and a medium.

BACKGROUND

With the rapid development of mobile Internet technology, video teaching resources have been greatly promoted. Digital teaching videos have been favored by teachers and students. Generally, the teaching video is long, the content of one lesson is presented in one video, and one video includes multiple knowledge points. Therefore, if one knowledge point in the video is required to be viewed, the video needs to be segmented.

In the above-mentioned scheme, there are at least the following technical problems: the video is segmented mainly according to specified frames, durations or content blank gaps; however, the segmentation mode according to specified frames or durations requires manual operations with the need of watching the whole content of the video in advance, and the segmentation according to content blank gaps is prone to inaccurate segmentation, which results in difficulties for viewers in understanding.

SUMMARY

The present application provides a video segmentation method and apparatus, a device, and a medium, to simplify the video segmentation process and improve the video segmentation accuracy.

An embodiment of the present application provides a video segmentation method. The method includes the steps described below.

A to-be-segmented video is acquired, and a correspondence between knowledge point data in the to-be-segmented video and video frames in the to-be-segmented video is determined.

The to-be-segmented video is segmented according to the correspondence to obtain at least one video segment.

An embodiment of the present application provides a video segmentation apparatus. The apparatus includes a knowledge point recognition module and a video segmentation module.

The knowledge point recognition module is configured to acquire a to-be-segmented video, and determine a correspondence between knowledge point data in the to-be-segmented video and video frames in the to-be-segmented video.

The video segmentation module is configured to segment the to-be-segmented video according to the correspondence to obtain at least one video segment.

An embodiment of the present application further provides a computer device.

The device includes one or more processors and a storage apparatus storing one or more programs.

The one or more programs, when executed by the one or more processors, cause the one or more processors to perform the video segmentation method provided by any of the embodiments of the present application.

An embodiment of the present application further provides a computer-readable storage medium storing a computer program which, when executed by a processor, performs the video segmentation method provided by any of the embodiments of the present application.

BRIEF DESCRIPTION OF DRAWINGS

FIG. 1 is a flowchart of a video segmentation method according to Embodiment one of the present application;

FIG. 2 is a flowchart of a video segmentation method according to Embodiment two of the present application;

FIG. 3A is a flowchart of a video segmentation method according to Embodiment three of the present application;

FIG. 3B is a flowchart of knowledge graph construction according to Embodiment three of the present application;

DETAILED DESCRIPTION

Figures 3C, 4:
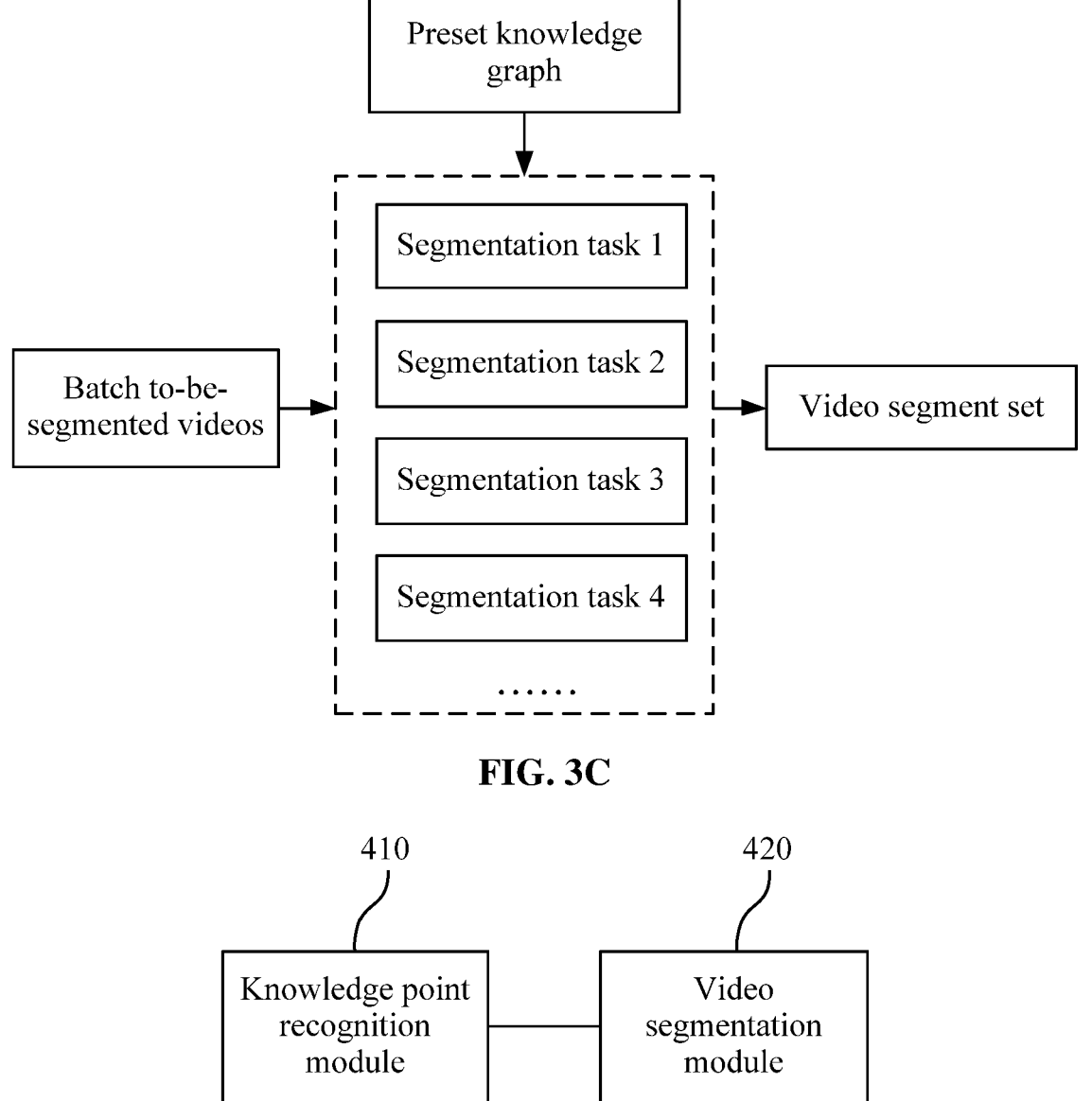
FIG. 3C is a flowchart of video segmentation storage according to Embodiment three of the present application.
FIG. 4 is a structural schematic diagram of a video segmentation apparatus according to Embodiment four of the present application.

The present application is described below in conjunction with drawings and embodiments. The embodiments described herein are intended to explain and not to limit the present application. For ease of description, only part, not all, of structures related to the present application is illustrated in the drawings.

Embodiment One

FIG. 1 is a flowchart of a video segmentation method according to Embodiment one of the present application. This embodiment is applicable to the case of segmenting a video, for example, to the case of segmenting a teaching video. The method may be performed by a video segmentation apparatus. The video segmentation apparatus may be implemented by software and/or hardware and for example, the video segmentation apparatus may be configured in a computer device. As shown in FIG. 1, the method includes steps S110 and S120.

In step S110, a to-be-segmented video is acquired, and a correspondence between knowledge point data in the to-be-segmented video and video frames in the to-be-segmented video is determined.

In this embodiment, the to-be-segmented video may be an education and teaching video or a popular science video. After a to-be-segmented video is acquired, the content of the to-be-segmented video is analyzed to extract the subtitle content, the speech content and/or the text content in video frames. After the above-mentioned recognized content is organized, the knowledge point data included in the to-be-segmented video and video frames corresponding to each knowledge point data may be obtained.

In an embodiment, the text area in the video frames may be located by using the connectionist text proposal network (CTPN) method, the text in the picture may be recognized by using the tessract tool, and the speech content in the video may be recognized by using the automatic speech recognition (ASP) technology to recognize. In one embodiment, through attribute extraction, relationship extraction and entity extraction performed on the recognized video content, structured data may be formed, and the knowledge point data included in the to-be-segmented video and the correspondence between the knowledge point data and video frames may be determined.

For example, assuming that the knowledge point data obtained after content extraction and organization of the to-be-segmented video includes knowledge point A, knowledge point B and knowledge point C, the correspondence between the knowledge point data and the video frames may be as follows: the video frame range corresponding to knowledge point A is 1 to 20, the video frame range corresponding to knowledge point B is 21 to 50, and the video frame range corresponding to knowledge point C is 51 to 90.

In another implementation of the present application, the knowledge point data corresponding to the to-be-segmented video may be directly acquired. In an embodiment, knowledge point data corresponding to different types of videos may be pre-determined, and after a to-be-segmented video is acquired, the knowledge point data corresponding to the to-be-segmented video is acquired according to the type of the to-be-segmented video. In an embodiment, if the to-be-segmented video is an education and teaching video, the type of the to-be-segmented video may be the subject and/or chapter to which the video to be segmented belongs. For example, assuming that the to-be-segmented video is junior high school mathematics teaching video, the knowledge point data corresponding to the junior high school mathematics subject may be acquired as the knowledge point data corresponding to the to-be-segmented video.

In step S120, the to-be-segmented video is segmented according to the correspondence to obtain at least one video segment.

In this embodiment, according to the video frame number range corresponding to the knowledge point data, the video frame interval corresponding to each knowledge point data may be taken as one video segment. For example, assuming that the video frame range corresponding to knowledge point A is 1 to 20, the video frame range corresponding to knowledge point B is 21 to 50 and the video frame range corresponding to knowledge point C is 51 to 90, the video segment corresponding to the video frames 1 to 20 may be determined as video segment 1, the video segment corresponding to the video frames 21 to 50 may be determined as video segment 2, and the video segment corresponding to the video frames 51 to 90 may be determined as video segment 3.

Given that video segments directly segmented according to the correspondence between the knowledge point data and the video frames may not be accurate enough, the correspondence may further be corrected by using a boundary detection method to obtain the correspondence between the corrected knowledge point data and the video frames, and the video frame interval corresponding to each corrected knowledge point data is taken as a video segment.

In this embodiment of the present application, a to-be-segmented video is acquired, a correspondence between knowledge point data in the to-be-segmented video and video frames in the to-be-segmented video is determined, and the to-be-segmented video is segmented according to the correspondence to obtain at least one video segment. In this manner, the to-be-segmented video is segmented according to the knowledge point data in the to-be-segmented video, thereby simplifying the video segmentation process and improving the video segmentation accuracy.

Embodiment Two

FIG. 2 is a flowchart of a video segmentation method according to Embodiment two of the present application. This embodiment is described on the basis of the above-mentioned embodiment. As shown in FIG. 2, the method includes steps S210, S220, S230, and S240.

In step S210, a to-be-segmented video is acquired, the to-be-segmented video is inputted into a pre-trained video segmentation model, segmentation data outputted from the video segmentation model is acquired, and a video frame number interval corresponding to the knowledge point data is determined according to the segmentation data.

In this embodiment, the to-be-segmented video is segmented through a machine learning algorithm. In one embodiment, the to-be-segmented video is inputted into a trained video segmentation model to obtain segmentation data outputted from the video segmentation model. The segmentation data outputted from the video segmentation model may include the knowledge point data included in the to-be-segmented video and the correspondence between the knowledge point data and the video frames. After the segmentation data outputted from the video segmentation model is acquired, the video frame number interval corresponding to the knowledge point data is determined according to the correspondence between the knowledge point data and the video frames included in the segmentation data. In an embodiment, the video segmentation model is constructed based on a neural network. The neural network may be a recurrent neural network (RNN) or other forms of neural network models.

On the basis of the above-mentioned scheme, the method further includes the following steps: a to-be-segmented sample video and segmentation data corresponding to the to-be-segmented sample video are acquired; and training sample pairs are generated based on the to-be-segmented sample video and the segmentation data corresponding to the to-be-segmented sample video, and a pre-constructed video segmentation model is trained by using the training sample pairs to obtain a trained video segmentation model.

In an embodiment, a video that has been already segmented may be acquired as a to-be-segmented sample video, the to-be-segmented sample video and the segmentation data corresponding to the to-be-segmented sample video are taken as a training sample pair, and the pre-constructed video segmentation model is trained by using multiple training sample pairs to obtain the trained video segmentation model. The video may be segmented manually, and the segmented video is taken as the to-be-segmented sample video.

In step S220, blurry demarcation points of the knowledge point data are determined according to the video frame number interval corresponding to the knowledge point data.

In this embodiment, after the correspondence between the knowledge point data and the video frames is acquired, the correspondence between the knowledge point data and the video frames is corrected, and the to-be-segmented video is segmented according to the corrected correspondence. When the above-mentioned correspondence is to be corrected, the blurry demarcation points of the knowledge point data need to be determined, and target demarcation points corresponding to the knowledge point data are determined based on the blurry demarcation points. In an embodiment, the boundary points of the video frame number interval corresponding to the knowledge point data may be taken as the blurry demarcation points of the knowledge point data. For example, assuming that the video frame number interval corresponding to knowledge point A is 21 to 50, the blurry demarcation points of knowledge point A are video frame 21 and video frame 50.

In step S230, candidate video frames within a set range are acquired based on the blurry demarcation points, boundary detection is performed on the candidate video frames, and target demarcation points corresponding to the knowledge point data are obtained.

In one implementation, a range may be preset for obtaining candidate video frames corresponding to the knowledge point data. In an embodiment, the range may be set as (a−5, a+5), where a is a video frame number corresponding to a blurry demarcation point of the knowledge point data. For each blurry demarcation point of the knowledge point data, the candidate video frames are acquired according to the set range, the boundary detection is performed on the candidate video frames, and the video frame numbers corresponding to the detected boundaries are taken as the target demarcation points of the knowledge point data. The boundary detection may be performed on the candidate video frames in the following manner: video segment features are extracted from candidate video frames, and the boundary detection is performed through a segmentation algorithm combining abrupt transition scenes with gradual transition scenes.

For example, if the set range is (a−5, a+5) and a blurry demarcation point of knowledge point A is video frame 21, video frames 16 to 26 are acquired as candidate video frames, and the boundary detection is performed on a video segment formed by video frames 16 to 26. Assuming that the detected boundary is video frame 22, video frame 22 is taken as a target demarcation point of knowledge point A.

In step S240, a video segment corresponding to the knowledge point data is determined according to the target demarcation points corresponding to the knowledge point data.

In this embodiment, the video segment formed by the target demarcation points of the knowledge point data is taken as a video segment corresponding to the knowledge point data. For example, if the target demarcation points corresponding to knowledge point A are video frame 22 and video frame 49, the video segment corresponding to knowledge point A is the video segment between video frame 22 and video frame 49.

In the technical scheme of this embodiment of the present application, the correspondence between the knowledge point data in the to-be-segmented video and the video frames in the to-be-segmented video is determined in the following manner the correspondence between the knowledge point data and the video frames is determined through the video segmentation model, and the target demarcation points corresponding to the knowledge point data are determined through a boundary detection method. In this manner, the correspondence between the knowledge point data and video frames is more accurate, thereby enabling the segmentation result of the to-be-segmented video to be more accurate.

Embodiment Three

FIG. 3A is a flowchart of a video segmentation method according to Embodiment three of the present application.

This embodiment is described on the basis of the above-mentioned embodiments. As shown in FIG. 3A, the method includes steps S310, S320, S330, S340, and S350.

In step S310, a to-be-segmented video is acquired, and a correspondence between knowledge point data in the to-be-segmented video and video frames in the to-be-segmented video is determined.

In step S320, the to-be-segmented video is segmented according to the correspondence to obtain at least one video segment.

In step S330, in a case where the at least one video segment is multiple video segments, an association relationship between the multiple video segments is determined according to an association relationship between the knowledge point data, and at least one learning path is determined according to the association relationship between the multiple video segments.

In this embodiment, after the to-be-segmented video is segmented, an association relationship between the segmented video segments is determined according to the association relationship between the knowledge point data, and a learning path is determined according to the association relationship between the video segments. The learning path is used for characterizing a learning order between the video segments.

In an embodiment, the association relationship between the knowledge point data may be a directed learning relationship between knowledge points. For example, in a case where if knowledge point B is to be learned, knowledge point A must be learned first, the association relationship between the knowledge points may be knowledge point A→knowledge point B. According to the video segments corresponding to the knowledge point data and the directed learning relationship between the knowledge point data, the directed learning relationship between the video segments may be determined, and the directed learning relationship between the video segments constitutes the learning path.

After the learning path is determined, the identifier of the learning path may further be determined according to the features of the learning path. For example, if there may be multiple learning paths between knowledge point A and knowledge point F, the learning paths may be identified according to the number of to-be-learned knowledge points, such as "shortest learning path" and "most comprehensive learning path". The shortest learning path may be a learning path with the least knowledge point data required to learn the target knowledge point, and the most comprehensive learning path may be a learning path with the most comprehensive knowledge point data required to learn the target knowledge point.

In one implementation of the present application, the association relationship between the knowledge point data may be acquired in the following manner a knowledge graph is acquired, and the association relationship between the knowledge point data is determined according to the knowledge graph.

The knowledge graph includes the knowledge point data and the association relationship between the knowledge point data. In an embodiment, the association relationship between knowledge points may be acquired through the knowledge graph. The knowledge graph may be established by extracting a knowledge relationship from the to-be-segmented video, or the pre-constructed knowledge graph may be directly acquired.

In one implementation, the knowledge graph may be preset by means of teaching materials, related books or Web crawlers. The preset knowledge graph serves as an important basis for subsequent video segmentation. In an embodiment, the preset knowledge graph may be continuously perfected manually or via programs, so as to improve the video segmentation accuracy.

In one implementation, the knowledge graph may be acquired by analyzing the to-be-segmented video, which includes the following steps: knowledge point data included in the to-be-segmented video is extracted, relationship extraction is performed on the knowledge point data, and a knowledge graph including the association relationship between the knowledge point data is constructed. FIG. 3B is a flowchart of knowledge graph construction according to Embodiment three of the present application. As shown in FIG. 3B, the subtitle content, the text recognition content and the speech content in the to-be-segmented video are organized, structured data is formed through attribute extraction, relationship extraction and entity extraction, then a preliminary knowledge graph is formed through entity alignment, entity disambiguation and knowledge fusion, and finally, a knowledge graph corresponding to the to-be-segmented video is determined after quality evaluation.

In step S340, in response to a detected video viewing instruction, a learning path corresponding to the video viewing instruction is determined.

After the learning path is determined according to the correspondence between the knowledge point data and the video segments and the association relationship between the knowledge point data, a learning path meeting the user demand may be recommended to the user according to the determined learning path and the learning demand of the user.

The video viewing instruction may be an instruction triggered by the user through the terminal and used for instructing the viewing of a video. For example, if the user needs to learn target knowledge point C, the user may trigger a video viewing request for learning target knowledge point C according to the prompt on the terminal interface. After the terminal detects the video viewing request triggered by the user, the terminal generates a video viewing instruction according to the video viewing request and sends the video viewing instruction to a video segmentation apparatus. The video segmentation apparatus parses the received video viewing instruction, acquires target knowledge point C included in the video viewing instruction, and acquires the learning path corresponding to target knowledge point C as the learning path corresponding to the video viewing instruction.

In an embodiment, the video viewing instruction may also include the learning demand of the user, and the video segmentation apparatus may select a learning path meeting the user demand from the learning paths corresponding to target knowledge point C according to the identifiers of the learning paths. For example, if the learning demand of the user is "the shortest learning path", the path with the shortest learning path is selected from the learning paths corresponding to target knowledge point C as the learning path corresponding to the video viewing instruction.

FIG. 3C is a flowchart of video segmentation storage according to Embodiment three of the present application. As shown in FIG. 3C, in this embodiment, multiple to-be-segmented videos may be acquired at the same time. The multiple to-be-segmented videos are segmented simultaneously according to a preset knowledge graph. After the multiple to-be-segmented videos are segmented, the same type of video segments are classified according to the types of video segments (such as subjects), the same type of video segments are stored in the same video segment set, and the similar types of video segment set may be marked to facilitate the subsequent video segment recommendation.

In step S350, path recommendation information is generated according to the learning path, and the path recommendation information is sent to a client for display.

After the learning path corresponding to the video viewing instruction is acquired, path recommendation information is generated according to the knowledge point data included in the learning path, and the path recommendation information is sent to the client for display. In an embodiment, the path recommendation information may be a directed learning relationship between knowledge point data or a directed learning relationship between video segments.

In the technical scheme of this embodiment of the present application, on the basis of the above-mentioned schemes, the operation of determining the learning path according to the association relationship between knowledge points is added, the learning path corresponding to the video viewing instruction is determined according to the video viewing instruction, the path recommendation information is generated according to the learning path, and the path recommendation information is sent to the client for display. In this manner, the learning path meeting the user demand can be recommended to the user, thereby improving the learning effect of the user.

Embodiment Four

FIG. 4 is a structural schematic diagram of a video segmentation apparatus according to Embodiment four of the present application. The video segmentation apparatus may be implemented by software and/or hardware and for example, the video segmentation apparatus may be configured in a computer device. As shown in FIG. 4, the apparatus includes a knowledge point recognition module 410 and a video segmentation module 420.

The knowledge point recognition module 410 is configured to acquire a to-be-segmented video and determine a correspondence between knowledge point data in the to-be-segmented video and video frames in the to-be-segmented video. The video segmentation module 420 is configured to segment the to-be-segmented video according to the correspondence to obtain at least one video segment.

In this embodiment of the present application, the knowledge point recognition module acquires a to-be-segmented video and determines a correspondence between knowledge point data in the to-be-segmented video and video frames in the to-be-segmented video, and the video segmentation module segments the to-be-segmented video according to the correspondence to obtain at least one video segment. In this manner, the to-be-segmented video is segmented according to the knowledge point data in the to-be-segmented video, thereby simplifying the video segmentation process and improving the video segmentation accuracy.

On the basis of the above-mentioned scheme, the knowledge point recognition module 410 is configured to: input the to-be-segmented video into a pre-trained video segmentation model, acquire segmentation data outputted from the video segmentation model, and determine a video frame number interval corresponding to the knowledge point data according to the segmentation data.

On the basis of the above-mentioned scheme, the video segmentation module 420 is configured to: determine blurry demarcation points of the knowledge point data according to the video frame number interval corresponding to the knowledge point data; acquire, based on the blurry demarcation points, candidate video frames within a set range, perform boundary detection on the candidate video frames, and obtain target demarcation points corresponding to the knowledge point data; and determine a video segment corresponding to the knowledge point data according to the target demarcation points corresponding to the knowledge point data.

In the above-mentioned scheme, the apparatus further includes a learning path determination module.

The learning path determination module is configured to, after the at least one video segment is obtained, in a case where the at least one video segment is multiple video segments, determine an association relationship between the multiple video segments according to an association relationship between the knowledge point data, and determine at least one learning path according to the association relationship between the multiple video segments, where the learning path is used for characterizing a learning order between the video segments.

In the above-mentioned scheme, the apparatus further includes an association relationship determination module.

The association relationship determination module is configured to, before the association relationship between the multiple video segments is determined according to the association relationship between the knowledge point data, acquire a knowledge graph, and determine the association relationship between the knowledge point data according to the knowledge graph.

On the basis of the above-mentioned scheme, the association relationship determination module is configured to: extract the knowledge point data included in the to-be-segmented video, and perform relationship extraction on the knowledge point data, and construct the knowledge graph including the association relationship between the knowledge point data.

On the basis of the above-mentioned scheme, the apparatus further includes a path recommendation module.

The path recommendation module is configured to determine, in response to a detected video viewing instruction, a learning path corresponding to the video viewing instruction; and generate path recommendation information according to the learning path, and send the path recommendation information to a client for display.

The video segmentation apparatus provided by this embodiment of the present application can execute the video segmentation method provided by any of the embodiments of the present application and has functional modules and effects corresponding to the executed methods.

Embodiment Five

Figure 5:
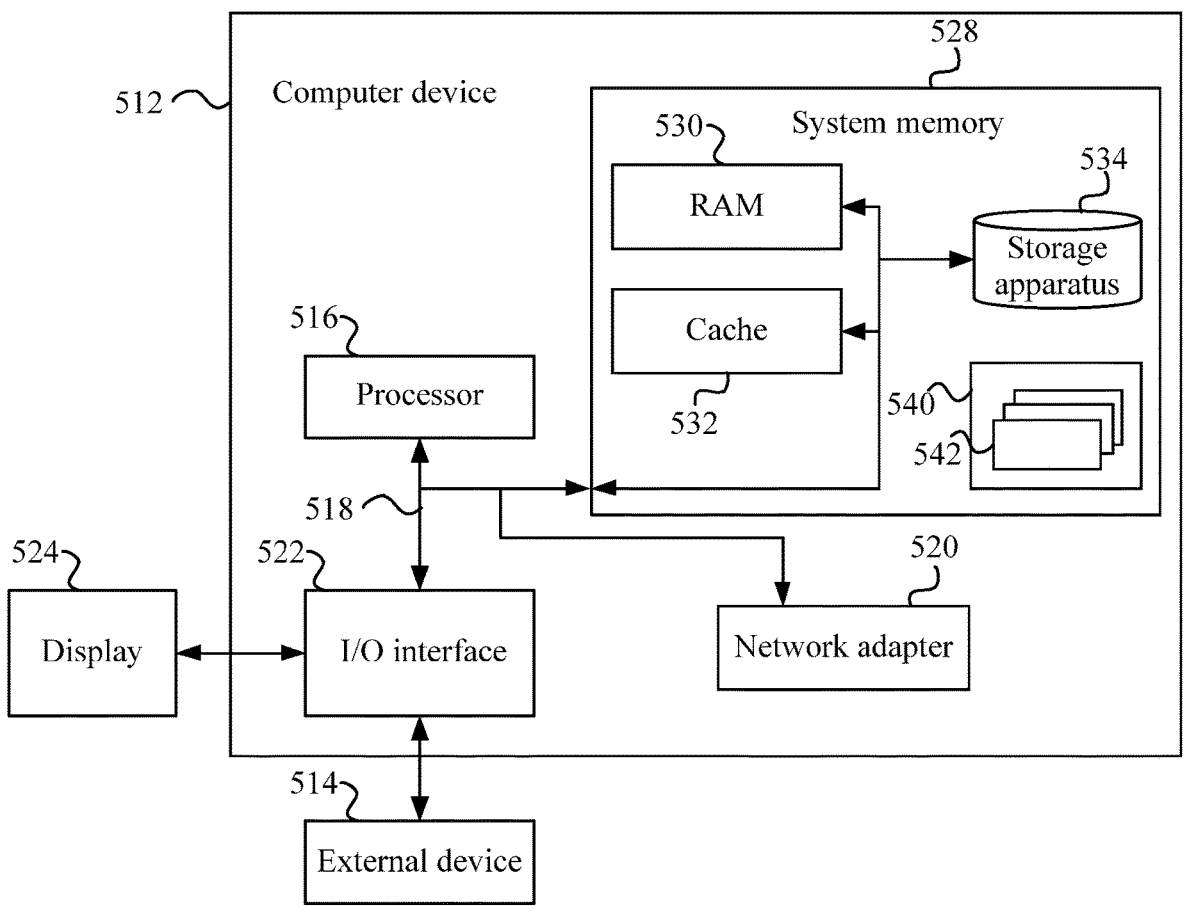
FIG. 5 is a structural diagram of a computer device according to Embodiment five of the present application.

FIG. 5 is a structural diagram of a computer device according to Embodiment five of the present application. FIG. 5 shows a block diagram of an exemplary computer device 512 suitable for the implementation of the embodiments of the present application. The computer device 512 shown in FIG. 5 is just an example and not intended to limit the function and use scope of this embodiment of the present application.

As shown in FIG. 5, the computer device 512 is shown in the form of a general-purpose computing device. The components of the computer device 512 may include, but are not limited to, one or more processors 516, a system memory 528, and a bus 518 that connect various system components (including the system memory 528 and the one or more processors 516).

The bus 518 represents one or more of several types of bus structures, including a memory bus or memory controller, a peripheral bus, an accelerated graphics port, a processor 516 or a local bus using any of a variety of bus architectures. For example, such architectures include, but are not limited to, an Industry Standard Architecture (ISA) bus, a Micro Channel Architecture (MAC) bus, an Enhanced ISA bus, a Video Electronics Standards Association (VESA) local bus, and a Peripheral Component Interconnect (PCI) bus.

The computer device 512 typically includes a variety of computer system readable media. Such media may be any available media that is accessible by the computer device 512 and includes both volatile and non-volatile media, removable and non-removable media.

The system memory 528 may include computer system readable media in the form of volatile memory, such as random access memory (RAM) 530, and/or a cache memory 532. The computer device 512 may include other removable/non-removable volatile/non-volatile computer system storage media. By way of example only, the storage apparatus 534 may be configured to read from and/or write to non-removable, non-volatile magnetic media (not shown in FIG. 5, commonly referred to as a "hard disk drive"). Although not shown in FIG. 5, a magnetic disk drive that is configured to read from and/or write to a removable non-volatile magnetic disk (such as a "floppy disk") and an optical disk drive that is configured to read from and/or write to a removable non-volatile optical disk (such as a compact disc read-only memory (CD-ROM), a digital versatile disc-read only memory (DVD-ROM), or other optical media) may be provided. In such instances, each drive may be connected to the bus 518 by one or more data media interfaces. The memory 528 may include at least one program product having a set (for example, at least one) of program modules that are configured to perform the functions of the embodiments of the present application.

The program/utility 540, having a set (at least one) of program modules 542, may be stored in the memory 528, and such program modules 542 include, but are not limited to an operating system, one or more application programs, other program modules, and program data, each or a combination of which may include an implementation of a networking environment. The program module 542 generally performs functions and/or methods described in the embodiments of the present application.

The computer device 512 may also be in communication with one or more external devices 514 (such as a keyboard, pointing device, display 524, and the like), or may be in communication with one or more devices that enable a user to interact with the computer device 512 and/or any device (such as a network card, modem, and the like) that enables the computer device 512 to communicate with one or more other computing devices. Such communication may be performed through an input/output (I/O) interface 522. The computer device 512 may also be in communication with one or more networks (such as a local area network (LAN), a wide area network (WAN), and/or a public network such as the Internet) through a network adapter 520. As shown in FIG. 5, the network adapter 520 communicates with other modules of the computer device 512 via the bus 518. It is to be noted that, although not shown, other hardware and/or software modules may be used in conjunction with the computer device 512, including, but not limited to, micro-code, device drives, redundant processors, external disk drive arrays, redundant arrays of independent disks (RAID) systems, tape drives, data backup storage systems, and the like.

The processor 516 executes programs stored in the system memory 528 to perform a variety of function applications and data processing, for example, to perform the video segmentation method provided by the embodiments of the present application. The method includes the steps described below.

A to-be-segmented video is acquired, and a correspondence between knowledge point data in the to-be-segmented video and video frames in the to-be-segmented video is determined, and the to-be-segmented video is segmented according to the correspondence to obtain at least one video segment.

The processor may also perform the technical schemes of the video segmentation method provided by any of the embodiments of the present application.

Embodiment Six

Embodiment six of the present application further provides a computer-readable storage medium storing a computer program, where the computer program, when executed by a processor, performs the video segmentation method provided by the embodiments of the present application. The method includes the steps described below.

A to-be-segmented video is acquired, and a correspondence between knowledge point data in the to-be-segmented video and video frames in the to-be-segmented video is determined, and the to-be-segmented video is segmented according to the correspondence to obtain at least one video segment.

In the computer-readable storage medium provided by this embodiment of the present application, the computer program stored thereon implements not only the above-mentioned method operations but also related operations in the video segmentation method provided by any of the embodiments of the present application.

The computer storage medium in this embodiment of the present application may use any combination of one or more computer-readable media. The computer-readable media may be computer-readable signal media or computer-readable storage media. The computer-readable storage medium may be, but is not limited to, an electrical, magnetic, optical, electromagnetic, infrared or semiconductor system, apparatus or element, or any combination thereof. Examples of the computer-readable storage media include (non-exhaustive list): an electrical connection having one or more wires, a portable computer diskette, a hard disk, an RAM, a read-only memory (ROM), an erasable programmable read-only memory (EPROM or flash memory), an optical fiber, a portable compact disk read-only memory (CD-ROM), an optical memory device, a magnetic memory device, or any suitable combination thereof. Herein, the computer-readable storage medium may be any tangible medium including or storing a program for use by or in connection with an instruction execution system, apparatus or device.

The computer-readable signal medium may include a propagated data signal with a computer-readable program code carried therein, for example, in baseband or as part of a carrier wave. Such a propagated data signal may be in multiple forms and includes, and is not limited to, an electromagnetic signal, an optical signal or any suitable combination thereof. The computer-readable signal medium may further be any computer-readable medium that is not a computer-readable storage medium and that can send, propagate or transmit a program for use by or in connection with an instruction execution system, apparatus or device.

The program code included on the computer-readable medium may be transmitted using any suitable medium, including, and not limited to, wireless, wireline, optical fiber cable, radio frequency (RF), etc., or any suitable combination thereof.

The computer program code for performing the operations of the present application may be written in one or more programming languages or a combination thereof, including object-oriented programming languages such as Java, Smalltalk, and C++, as well as conventional procedural programming languages such as Language C or programming languages similar thereto. The program code may be executed entirely on a user's computer, partly on the user's computer, as a stand-alone software package, partly on the user's computer and partly on a remote computer or entirely on the remote computer or server. In the scenario involving the remote computer, the remote computer may be connected to the user's computer through any type of network, including an LAN or a WAN, or may be connected to an external computer (for example, through the Internet using an Internet service provider).

What is claimed is:

1. A video segmentation method, comprising:
   acquiring a to-be-segmented video, and determining a correspondence between knowledge point data in the to-be-segmented video and video frames in the to-be-segmented video; and
   segmenting the to-be-segmented video according to the correspondence to obtain at least one video segment;
   wherein determining the correspondence between the knowledge point data in the to-be-segmented video and the video frames in the to-be-segmented video comprises:
   inputting the to-be-segmented video into a pre-trained video segmentation model, acquiring segmentation data outputted from the video segmentation model, and determining a video frame number interval corresponding to the knowledge point data according to the segmentation data;
   wherein segmenting the to-be-segmented video according to the correspondence to obtain the at least one video segment comprises:
   determining blurry demarcation points of the knowledge point data according to the video frame number interval corresponding to the knowledge point data;
   acquiring, based on the blurry demarcation points, candidate video frames within a set range, performing boundary detection on the candidate video frames, and obtaining target demarcation points corresponding to the knowledge point data; and
   determining a video segment corresponding to the knowledge point data according to the target demarcation points corresponding to the knowledge point data.

2. The method of claim 1, after obtaining the at least one video segment, further comprising:
   in a case where the at least one video segment is a plurality of video segments, determining an association relationship between the plurality of video segments according to an association relationship between the knowledge point data, and determining at least one learning path according to the association relationship between the plurality of video segments, wherein the at least one learning path is used for characterizing a learning order between the plurality of video segments.

3. The method of claim 2, before determining the association relationship between the plurality of video segments according to the association relationship between the knowledge point data, further comprising:

acquiring a knowledge graph, and determining the association relationship between the knowledge point data according to the knowledge graph.

4. The method of claim 3, wherein acquiring the knowledge graph comprises:

extracting the knowledge point data comprised in the to-be-segmented video; and performing relationship extraction on the knowledge point data, and constructing the knowledge graph comprising the association relationship between the knowledge point data.

5. The method of claim 2, further comprising:

determining, in response to a detected video viewing instruction, a learning path corresponding to the video viewing instruction; and generating path recommendation information according to the learning path, and sending the path recommendation information to a client for display.

6. The method of claim 1, further comprising:

acquiring a to-be-segmented sample video and segmentation data corresponding to the to-be-segmented sample video; and generating training sample pairs based on the to-be-segmented sample video and the segmentation data corresponding to the to-be-segmented sample video, and training a pre-constructed video segmentation model by using the training sample pairs to obtain a trained video segmentation model.

7. A computer device, comprising:

at least one processor; and a storage apparatus storing at least one program;

wherein the at least one program, when executed by the at least one processor, causes the at least one processor to perform:

acquiring a to-be-segmented video, and determining a correspondence between knowledge point data in the to-be-segmented video and video frames in the to-be-segmented video; and segmenting the to-be-segmented video according to the correspondence to obtain at least one video segment;

wherein determining the correspondence between the knowledge point data in the to-be-segmented video and the video frames in the to-be-segmented video comprises:

inputting the to-be-segmented video into a pre-trained video segmentation model, acquiring segmentation data outputted from the video segmentation model, and determining a video frame number interval corresponding to the knowledge point data according to the segmentation data;

wherein segmenting the to-be-segmented video according to the correspondence to obtain the at least one video segment comprises:

determining blurry demarcation points of the knowledge point data according to the video frame number interval corresponding to the knowledge point data;

acquiring, based on the blurry demarcation points, candidate video frames within a set range, performing boundary detection on the candidate video frames, and obtaining target demarcation points corresponding to the knowledge point data; and determining a video segment corresponding to the knowledge point data according to the target demarcation points corresponding to the knowledge point data.

8. The computer device of claim 7, after obtaining the at least one video segment, further performing:

in a case where the at least one video segment is a plurality of video segments, determining an association relationship between the plurality of video segments according to an association relationship between the knowledge point data, and determining at least one learning path according to the association relationship between the plurality of video segments, wherein the at least one learning path is used for characterizing a learning order between the plurality of video segments.

9. The computer device of claim 8, before determining the association relationship between the plurality of video segments according to the association relationship between the knowledge point data, further comprising:

acquiring a knowledge graph, and determining the association relationship between the knowledge point data according to the knowledge graph.

10. The computer device of claim 9, wherein acquiring the knowledge graph comprises:

extracting the knowledge point data comprised in the to-be-segmented video; and performing relationship extraction on the knowledge point data, and constructing the knowledge graph comprising the association relationship between the knowledge point data.

11. The computer device of claim 8, further performing:

determining, in response to a detected video viewing instruction, a learning path corresponding to the video viewing instruction; and generating path recommendation information according to the learning path, and sending the path recommendation information to a client for display.

12. The computer device of claim 7, further comprising:

acquiring a to-be-segmented sample video and segmentation data corresponding to the to-be-segmented sample video; and generating training sample pairs based on the to-be-segmented sample video and the segmentation data corresponding to the to-be-segmented sample video, and training a pre-constructed video segmentation model by using the training sample pairs to obtain a trained video segmentation model.

13. A non-transitory computer-readable storage medium storing a computer program, wherein the computer program, when executed by a processor, performs:

acquiring a to-be-segmented video, and determining a correspondence between knowledge point data in the to-be-segmented video and video frames in the to-be-segmented video; and segmenting the to-be-segmented video according to the correspondence to obtain at least one video segment;

wherein determining the correspondence between the knowledge point data in the to-be-segmented video and the video frames in the to-be-segmented video comprises:

inputting the to-be-segmented video into a pre-trained video segmentation model, acquiring segmentation data outputted from the video segmentation model, and determining a video frame number interval corresponding to the knowledge point data according to the segmentation data;

wherein segmenting the to-be-segmented video according to the correspondence to obtain the at least one video segment comprises:

determining blurry demarcation points of the knowledge point data according to the video frame number interval corresponding to the knowledge point data;

acquiring, based on the blurry demarcation points, candidate video frames within a set range, performing boundary detection on the candidate video frames, and obtaining target demarcation points corresponding to the knowledge point data; and determining a video segment corresponding to the knowledge point data according to the target demarcation points corresponding to the knowledge point data.

14. The non-transitory computer-readable storage medium of claim 13, after obtaining the at least one video segment, further performing:

in a case where the at least one video segment is a plurality of video segments, determining an association relationship between the plurality of video segments according to an association relationship between the knowledge point data, and determining at least one learning path according to the association relationship between the plurality of video segments, wherein the at least one learning path is used for characterizing a learning order between the plurality of video segments.

* * * * *